US012006690B2

(12) United States Patent
Lenney

(10) Patent No.: US 12,006,690 B2
(45) Date of Patent: Jun. 11, 2024

(54) HEATED CABLE COVER FOR GUTTER DEBRIS PRECLUSION DEVICES

(71) Applicant: GutterGlove, Inc., Franklin, TN (US)

(72) Inventor: Robert C. Lenney, Lincoln, CA (US)

(73) Assignee: GUTTERGLOVE, INC., Franklin, TN (US)

( * ) Notice: Subject to any disclaimer, the term of this patent is extended or adjusted under 35 U.S.C. 154(b) by 0 days.

(21) Appl. No.: 17/929,675

(22) Filed: Sep. 2, 2022

(65) Prior Publication Data

US 2022/0412094 A1 Dec. 29, 2022

Related U.S. Application Data

(60) Continuation of application No. 16/708,371, filed on Dec. 9, 2019, now Pat. No. 11,459,762, which is a division of application No. 15/049,372, filed on Feb. 22, 2016, now Pat. No. 10,501,940.

(60) Provisional application No. 62/119,009, filed on Feb. 20, 2015.

(51) Int. Cl.
*E04D 13/076* (2006.01)
*H05B 3/06* (2006.01)

(52) U.S. Cl.
CPC ....... *E04D 13/0762* (2013.01); *E04D 13/076* (2013.01); *H05B 3/06* (2013.01); *H05B 2203/014* (2013.01); *H05B 2214/02* (2013.01)

(58) Field of Classification Search
CPC . E04D 13/076; E04D 13/064; E04D 13/0725; E04D 13/072; E04D 13/158; E04D 13/0643; E04D 13/0762; H05B 3/06; H05B 2203/014; H05B 2203/016; H05B 2214/02
USPC ......................... 210/155; 219/213; 52/11–16
See application file for complete search history.

(56) References Cited

U.S. PATENT DOCUMENTS

| | | | | | |
|---|---|---|---|---|---|
| 3,521,029 | A * | 7/1970 | Toyooka | H05B 3/342 | 392/435 |
| 3,821,512 | A * | 6/1974 | Stanford | H05B 3/00 | 219/535 |
| 4,081,657 | A * | 3/1978 | Stanford | E04D 13/103 | 338/285 |
| 4,235,008 | A * | 11/1980 | Meredith | E04H 4/1227 | 4/510 |

(Continued)

OTHER PUBLICATIONS

Valor Gutter Guard's Melt Away Use Guide, published Apr. 2014.

*Primary Examiner* — Kyle J. Walraed-Sullivan
(74) *Attorney, Agent, or Firm* — Jonathan Kidney; Glen Gross; Intelink Law Group, P.C.

(57) ABSTRACT

The present invention includes a cover for use with a heat element and gutter debris preclusion devices. The cover includes a body, a front member, and a middle portion disposed between the body and the front member. The body includes a lip being operably configured to extend beyond an outer edge of the gutter when the cover is in use. The cover also includes a channel defined by the middle portion and at least the front member, wherein the channel is operably configured to receive the heat element. The cover is operably configured to hold the heat element to the gutter debris preclusion device. When the heat element is energized it will generate heat. The cover will enable the generated heat to transfer to the gutter debris preclusion device and to a gutter to which it is attached.

20 Claims, 6 Drawing Sheets

(56) References Cited

U.S. PATENT DOCUMENTS

| | | | | | |
|---|---|---|---|---|---|
| 4,308,696 | A * | 1/1982 | Schroeder | E04D 13/0762 | 52/11 |
| 4,769,526 | A * | 9/1988 | Taouil | E04D 13/103 | 52/12 |
| 5,406,754 | A * | 4/1995 | Cosby | E04D 13/076 | 52/12 |
| 5,848,857 | A * | 12/1998 | Killworth | E04D 13/076 | 210/474 |
| 5,878,533 | A * | 3/1999 | Swanfeld, Jr. | E04D 13/0762 | 52/11 |
| 6,463,700 | B2 * | 10/2002 | Davis | E04D 13/076 | 52/95 |
| 6,708,452 | B1 * | 3/2004 | Tenute | E04D 13/0762 | 52/12 |
| 6,759,630 | B1 * | 7/2004 | Tenute | E04D 13/103 | 52/11 |
| 7,104,012 | B1 * | 9/2006 | Bayram | E04D 13/076 | 52/12 |
| RE42,896 | E * | 11/2011 | Higginbotham | E04D 13/076 | 52/12 |
| 8,720,132 | B2 * | 5/2014 | Chihlas | H02S 20/23 | 52/173.3 |
| 8,782,960 | B2 * | 7/2014 | Nark | E04D 13/0762 | 52/13 |
| 8,901,458 | B2 * | 12/2014 | Aussi | E04D 13/0762 | 392/435 |
| 9,487,955 | B2 | 11/2016 | Breyer | | |
| 9,890,535 | B2 | 2/2018 | Breyer | | |
| 9,976,309 | B2 * | 5/2018 | Lenney | E04D 13/076 | |
| 9,982,438 | B2 | 5/2018 | Casey | | |
| 2005/0257433 | A1 * | 11/2005 | Dussault | E04D 13/08 | 52/12 |
| 2006/0037252 | A1 * | 2/2006 | Gosse | E04D 13/076 | 52/11 |
| 2006/0196124 | A1 * | 9/2006 | Bachman | E04D 13/0762 | 52/12 |
| 2006/0213129 | A1 * | 9/2006 | Bachman | E04D 13/0762 | 52/11 |
| 2006/0277831 | A1 * | 12/2006 | Bachman | E04D 13/0762 | 52/11 |
| 2006/0283096 | A1 * | 12/2006 | Bachman | E04D 13/0762 | 52/11 |
| 2006/0288652 | A1 * | 12/2006 | Gurr | E04D 13/103 | 52/198 |
| 2007/0094939 | A1 * | 5/2007 | Bachman | E04D 13/0762 | 52/11 |
| 2009/0300995 | A1 * | 12/2009 | Nikolopoulos | E04D 13/076 | 52/12 |
| 2010/0088971 | A1 * | 4/2010 | Horton | E04D 13/076 | 52/12 |
| 2010/0287846 | A1 * | 11/2010 | Lenney | E04D 13/0762 | 52/12 |
| 2011/0047930 | A1 * | 3/2011 | Nark | H05B 3/06 | 52/745.19 |
| 2011/0049118 | A1 * | 3/2011 | Nark | E04D 13/103 | 248/237 |
| 2011/0067318 | A1 * | 3/2011 | Lenney | E04D 13/076 | 52/12 |
| 2011/0089154 | A1 * | 4/2011 | Aussi | E04D 13/064 | 219/213 |
| 2011/0107683 | A1 * | 5/2011 | Ringuette | E04D 13/076 | 52/12 |
| 2011/0297662 | A1 * | 12/2011 | Clark | E04D 13/103 | 219/213 |
| 2012/0091116 | A1 * | 4/2012 | Casey | E04D 13/103 | 219/536 |
| 2012/0168419 | A1 * | 7/2012 | Bublitz | E04D 13/103 | 52/12 |
| 2012/0297696 | A1 * | 11/2012 | Albracht | E04D 13/076 | 52/11 |
| 2013/0319990 | A1 * | 12/2013 | Casey | E04D 13/103 | 219/213 |
| 2014/0069028 | A1 * | 3/2014 | Lenney | E04D 13/0404 | 52/12 |
| 2014/0090311 | A1 * | 4/2014 | Iannelli | H05B 3/0014 | 52/12 |
| 2014/0291310 | A1 * | 10/2014 | Iannelli | E04D 13/103 | 219/213 |
| 2014/0326837 | A1 * | 11/2014 | Rumsey | H05B 3/06 | 248/65 |
| 2015/0184394 | A1 * | 7/2015 | Nark | H05B 3/56 | 52/302.1 |
| 2016/0102459 | A1 * | 4/2016 | Breyer | E04D 13/0767 | 52/12 |
| 2016/0168858 | A1 * | 6/2016 | Breyer | E04D 13/103 | 52/173.1 |
| 2018/0216755 | A1 * | 8/2018 | Rumsey | F16L 3/02 | |

* cited by examiner

HEATED CABLE COVER FOR GUTTER DEBRIS PRECLUSION DEVICES

CROSS-REFERENCE TO RELATED APPLICATION(S)

This application is a continuation of and claims the benefit of U.S. patent application Ser. No. 16/708,371 filed Dec. 9, 2019 (issued as U.S. Pat. No. 11,459,762 on Oct. 4, 2022), which is a divisional of U.S. patent application Ser. No. 15/049,372 filed Feb. 22, 2016 (issued as U.S. Pat. No. 10,501,940 on Dec. 10, 2019), which claims the priority and benefit of U.S. Provisional Patent Application No. 62/119,009, filed Feb. 20, 2015, the contents of which are hereby incorporated by reference in their entirety.

FIELD OF THE INVENTION

This invention relates to gutter debris preclusion devices for rain gutters and similar structures for keeping leaves and other debris out of the rain gutters. More particularly, this invention relates to de-freezing rain gutter debris preclusion devices.

BACKGROUND OF THE INVENTION

There are many types of conventional gutter debris preclusion devices (gutter guard systems). These gutter guard systems generally span the opening of a gutter and are designed to keep leaves and debris from entering a gutter while allowing the water to pass through to the gutter. One problem experienced by all different types of gutter guard systems in certain environments is that when freezing temperatures are encountered, water on and adjacent the gutter guard will freeze, and preclude water from passing into the gutter. When such gutter guard performance is inhibited, freeze and thaw cycles can result in dangerously large icicles forming off of edges of the gutters or other portions of the roof. Furthermore, the weight of the snow and ice on the gutter guard can potentially damage the gutter or gutter guard, or at least require that it be designed to withstand high loads, increasing the complexity, and cost of the gutter guards. Gutter guards that experience these freezing issues are called non-de-icing gutter guards.

Another problem with non-de-icing gutter guards is "ice dams" can form. Particularly, the heat from the inside of a building can transfer out to the roof and begins melting snow. The melted snow run-off goes down the roof and when melted snow then encounters the portion of the roof overhanging the building, which is general of a freezing temperature, the melted snow begins to freeze again. This creates a build up of a wall of frozen water. Then the water begins to pool above the ice dam and then the melted snow, with nowhere else to go, will tend to find its way through the roof and into the home, causing damage.

There are many various prior art gutter guard systems that attempt to address this problem, such as a system described in U.S. Pat. No. 7,448,167 and the devices described in U.S. Pat. Nos. 8,079,183 and 8,438,787. Each of these patents are incorporated herein in their respective entireties. Each of these systems and devices and other conventional devices, which attempt to de-ice have certain drawbacks. And the present invention overcomes these drawbacks.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

Various embodiments describe a heat cable cover for gutter guard systems.

For example, one aspect of the disclosed embodiments, a heat cable cover comprising: a body being operably configured to attach to at least one of the gutter debris preclusion and the gutter, wherein the body includes a lip being operably configured to extend beyond an outer edge of the gutter when the cover is in use; a front member; a middle portion disposed between the body and the front member; and, a channel defined by the middle portion and at least the front member, wherein the channel is operably configured to receive the heat element. In some exemplary embodiments, the body, the middle portion and the front member are made from a unitary piece of material. Still further in other embodiments, the lip includes an angle relative to the body. Yet a further embodiment of the invention the channel has a cross-sectional shape of a partial rectangle. In other exemplary embodiments, the channel has a cross-sectional shape of a partial ellipse. Still further, in other exemplary embodiments, the channel has a cross-sectional shape of a partial sinusoidal curve. The cover in other exemplary embodiments further includes a surface of the body. In some exemplary embodiments, the body includes a fastener area operably configured to receive a fastener. In other exemplary embodiments, the front member includes a bottom portion, wherein the bottom portion extends toward the channel.

In another aspect of the present invention, a cover is disclosed for use with a gutter debris preclusion device attachable to a gutter, comprising: a body being operably configured to attach to at least one of the gutter debris preclusion device and the gutter, wherein the body includes a lip being operably configured to extend beyond an outer edge of the gutter guard when the cover is in use; a front leg; a middle portion disposed between the body and the front leg; a heat element; and, a channel defined by the middle portion and at least the front member, wherein the channel is operably configured to receive the heat element.

In yet another aspect of the disclosed embodiments, the device described above is provided, wherein the channel has a cross-sectional shape of a partial rectangle. In other embodiment, the device described above is provided, wherein the channel has a cross-sectional shape of a partial ellipse. Still in further embodiments, the device described above is provided, wherein the channel has a cross-sectional shape of a partial sinusoidal curve. In other exemplary embodiments, the device described above is provided wherein the front member includes a bottom portion, wherein the bottom portion extends toward the channel.

In another aspect of the present invention, a device is disclosed for use with a heat cable and gutter guards, comprising: a cover having a body and a front leg, the body being operably configured to attach to the gutter debris preclusion device, wherein the body includes a lip being operably configured to extend beyond an outer edge of the gutter when the cover is in use; wherein a channel is defined by the body and the front leg; and, wherein the channel is operably configured to receive the heat cable when the device is in use.

In yet another aspect of the disclosed embodiments, the device described above is provided, wherein the channel has a cross-sectional shape of a partial rectangle. In yet another aspect of the disclosed embodiments, the device described above is provided, the channel has a cross-sectional shape of a partial ellipse. Still further in other exemplary embodiments the device described above is provided, wherein the channel has a cross-sectional shape of a partial sinusoidal curve. In yet another aspect of the disclosed embodiments, the device described above is provided, further including a second body member opposed to the body and wherein the channel is further defined by the second body member. In yet another aspect of the disclosed embodiments, the device described above is provided, wherein the wherein the lip includes an angle relative to the body.

These and other features and advantages of this invention are described in, or are apparent from, the following detailed description of various exemplary embodiments of the devices and methods according to this invention.

BRIEF DESCRIPTION OF THE DRAWINGS

Various exemplary embodiment of this invention will be described in detail, with reference to the following figures, wherein.

DETAILED DESCRIPTION

Figure 1:
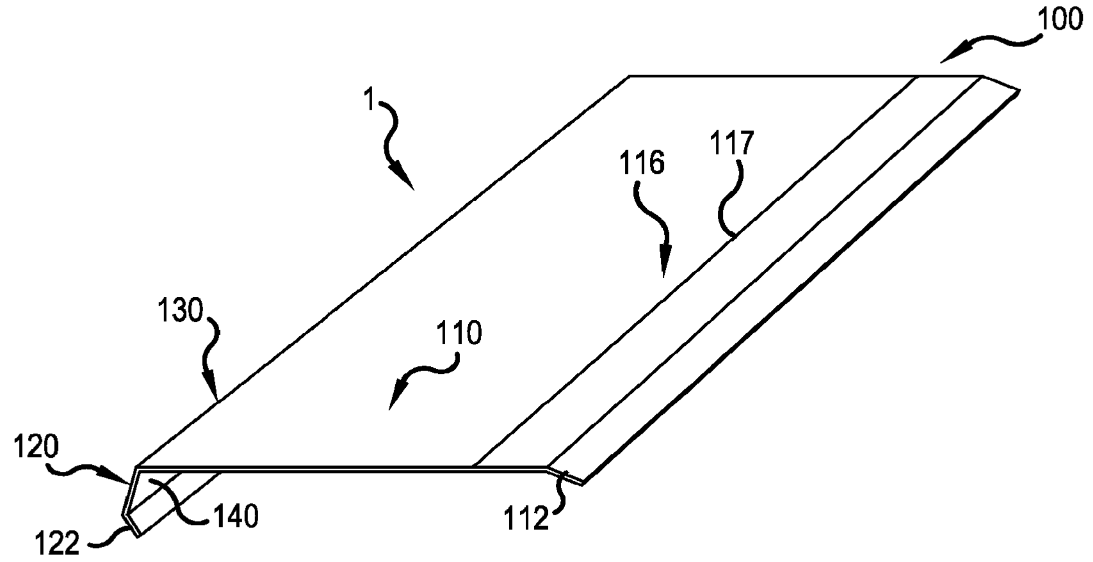
FIG. 1 is a top left side perspective view of an embodiment of a heat cable cover made in accordance with this invention.
Figure 2:
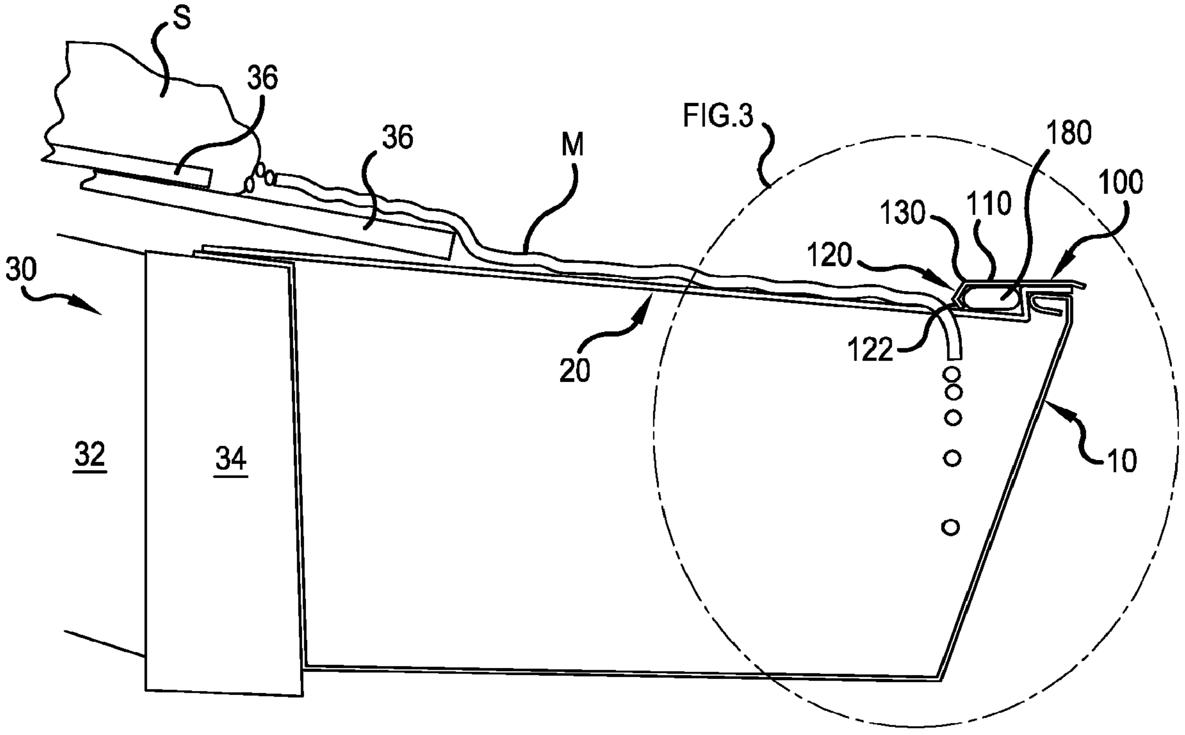
FIG. 2 is a partial side cross-section view of a gutter guard on a gutter, which is attached to a building with the cover of FIG. 1.
Figure 3:
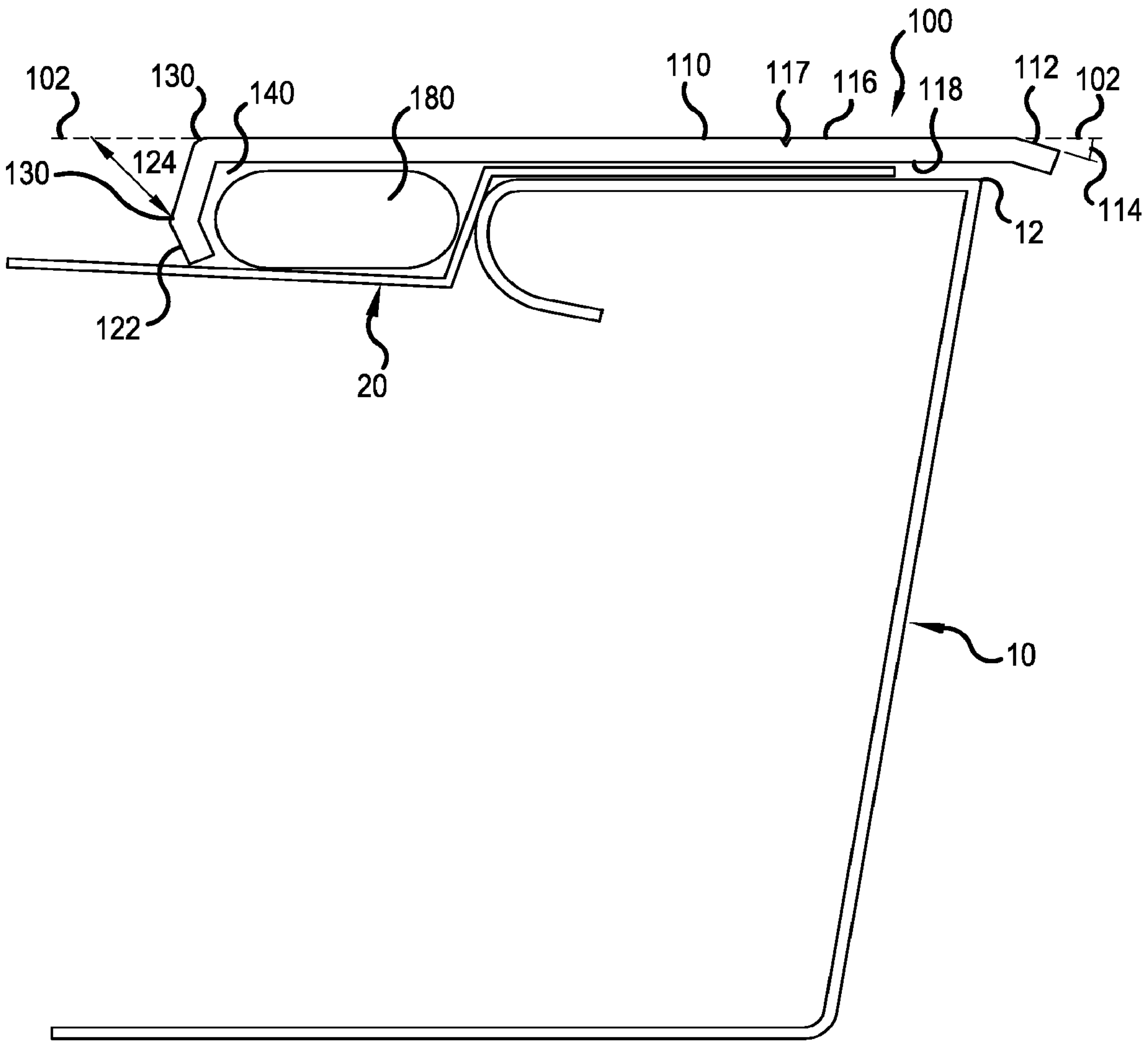
FIG. 3 is a close up of the gutter guard with the cover of FIG. 1.

Referring to the drawings, wherein like reference numerals represent like parts throughout the various drawing figures, FIGS. 1-3 display a cover 100 for use with a debris preclusion device or gutter guard made in accordance with the present invention. FIG. 1 is a top left side perspective view of the cover device 100 made in accordance with the invention. The device 100 includes a main body 110, a front member or leg 120 and a middle member 130. FIG. 2 illustrates a side view of the cover 100 when in use in connection with a gutter 10 and a gutter debris preclusion device (gutter guard) 20. FIG. 3 illustrates a side view of the illustration and the device 100 of FIG. 2 taken along the line FIG. 3 in FIG. 2. A heat element 180 is held adjacent to the gutter debris preclusion device 20 with the cover 100. The cover 100 includes a channel 140 defined by a portion of the main body 110, the front member 120 and the middle portion 130. The heat element 180 is disposed substantially within the channel 140 when the cover 100 is in use. Any conventional heat element may be utilized. It will be understood that any heating element that is operably configured to increase in temperature when desired by a user and that is capable of fitting within the channel of the cover of a particular embodiment of the present invention.

The gutter 10 is any conventional gutter. The gutter 10 is affixed to a building 30. The building will generally include a rafter 32 and a fascia 34 attached to the rafter. Shingles will generally be disposed above the fascia and rafters to shed water off the building. The construction of the building is not determinative for this invention. A building with a gutter and a gutter guard is merely an exemplary intended environment and exemplary application of this invention.

The heat element 180, when energized, will increase in temperature. As the heat element increases in temperature, the generated heat will be transferred to the cover 100. This heat transfer happens via conduction to the cover 100. Heat transfer also happens from the heat element 180 to the gutter guard, when the device is in use, since the cover 100 is in direct contact with the heat element 180 and is holding it in place in the channel 180 and directly against the gutter guard 20. The heat transfer can also occur through convention and radiation from the heat element 180 the cover 100 and the gutter guard 20. The more the cover 100 is in contact with the heat element 180, the more the heat transfer will increase and thus the overall functionality of the device.

The heat being transferred from the heat element 180 to the cover 100 and the gutter guard will transfer to the surrounding area and throughout the gutter guard 20 and the gutter 10. It will and should be understood and appreciated that the transfer of heat from the heat element 180 will be directly related to the materials of the cover 100 and the gutter guard 20.

As heat is transferred throughout the gutter guard 20 and the gutter 100, snow S will melt. The snowmelt M will fall through the gutter guard 20 and into the gutter as intended by conventional gutter guard devices. Note, the snow melt M is not shown in FIG. 3.

The middle member 130 is disposed between the main body 110 and the front member 120. In this exemplary embodiment, the device 130 is a unitary piece of material. The single piece of material forms the main body 110, the front member 120 and the middle member 130.

It is preferred that the cover 100 be made of aluminum. It should be appreciated that the various parts of the cover 100 could be made of differing materials.

In this exemplary embodiment, the cover 100 is preferably made from a flexible material so that it may be bendable along its length. Being bendable along its length will enable the cover 100 to be used on a gutter guard that has a steeper angle relative to the building fascia and not perpendicular as shown in FIG. 2. The gutter guard 20 would have to have a steeper angle relative to the roof if the building itself has a steeper roof. The cover 100 in various embodiments, wherein it is made from a flexible material, will allow it to bend and adapt to the steeper angle.

In this exemplary embodiment a portion of the main body 110 extends beyond the gutter front edge 12. The portion of the main body 110 that extends or overhangs the front edge 12 includes a lip 112 as shown in FIG. 3. The lip 112 angled relative to a plane 102 of the main body 110. The lip angle 114 is preferably about 5 degrees to about 89 degrees. More preferably, the lip angle 114 is about 30 degrees to about 50 degrees. The lip angle 114 is preferable an angle such that the lip 112 extends toward the ground when the cover 100 is in use. The lip 112 will direct rainwater and snowmelt away from the gutter so that it does not drip down the side of the gutter 10. This enhances the elimination of icicles forming on the gutter 10 and also enhances the elimination the unsightly staining on the side of the gutter 10, which can be caused by dirty rainwater and snowmelt. It should be appreciated that other exemplary embodiments of covers of the present invention do not include the lip on the main body.

In this exemplary the main body 110 is operably configured to attach to the gutter guard 20. The main body 110 in this exemplary embodiment includes a fastening area 116. In this exemplary embodiment the fastening area 116 includes an indent 117 on a surface of the main body 110. The indent is utilized as a guide for inserting fasteners, not shown, through the cover 100 and into the gutter guard 12 and/or the gutter 10. It will be appreciated that a variety of fasteners can be utilized, such as but not limited to screws, rivets, etc. The indent 117 will help an installer visually understand where to place the fastener when attaching the cover 100 to the gutter.

It should be appreciated that in other exemplary embodiments a fastener can be utilized on under surface 118 of the main body 110. As will be shown below in other various embodiments, a double-sided tape is utilized to affix the cover to the gutter or the gutter guard.

The middle portion 130 is a bend in the material of cover 100. The middle portion 130 connects the main body 110 to the front member 120. The cross-sectional shape of the middle portion 130, in this embodiment is generally arched shaped. It is preferred in this embodiment to be a partial sinusoidal curve.

The front member 120 includes a bottom portion 122. The bottom portion 122, when the cover 100 is in use and installed on the gutter 10, is operably configured to be in contact with the gutter guard 20. With this arrangement, the heat element will remain securely within the channel 140. The front member 120, when the cover 100 is in use, will stop the snowmelt M from dripping off the end of the gutter as shown in FIG. 2. The bottom portion 122 is disposed to extend in a direction toward the lip 112. The bottom portion further defines the channel 140. In this exemplary embodiment, the bottom portion is disposed opposed from middle member 120 about the channel 140. Having the bottom portion 122 further forming and defining a part of the channel 140 will enable the cover to hold the heat element in a more secure fashion when the cover is in use, than without the bottom member 122.

In this exemplary embodiment, the front member has a front member angle 124, which is relative to the plane 102 of the main body 110 as shown in FIG. 3. The angle 124 is preferred to be less than 90 degrees. More preferably, the angle 124 is preferred to be about 5 degrees to about 89 degrees. More preferably, the angle 124 is preferred to be about 45 degrees to about 80 degrees. The angle 124 allows the front member 120 to help shed leaves and pine needles to the top of the gutter guard 20, when the cover 100 is in use.

Figure 4:
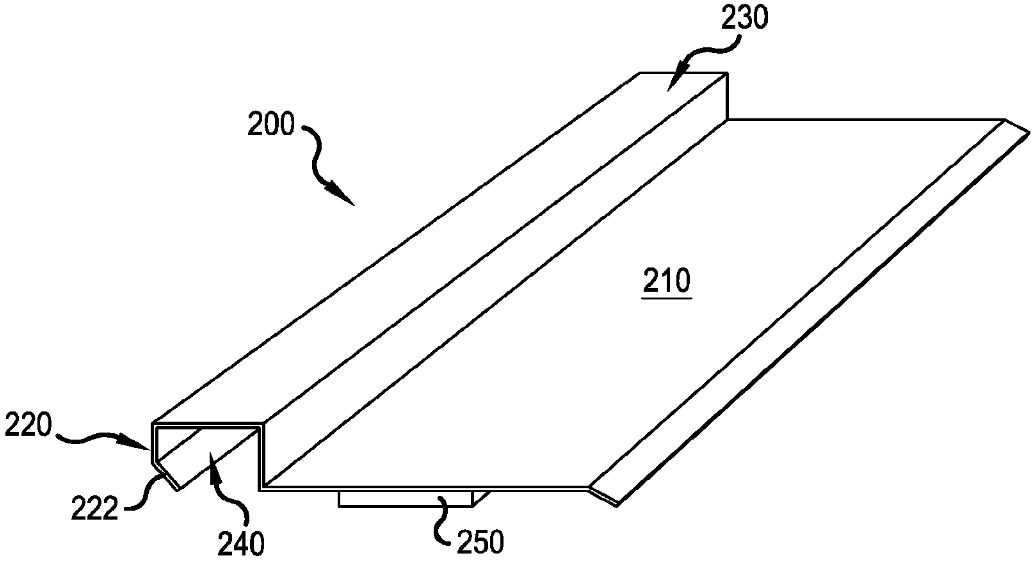
FIG. 4 is a top left side perspective view of an alternative embodiment of a heat cable cover made in accordance with the present invention.
Figure 5:
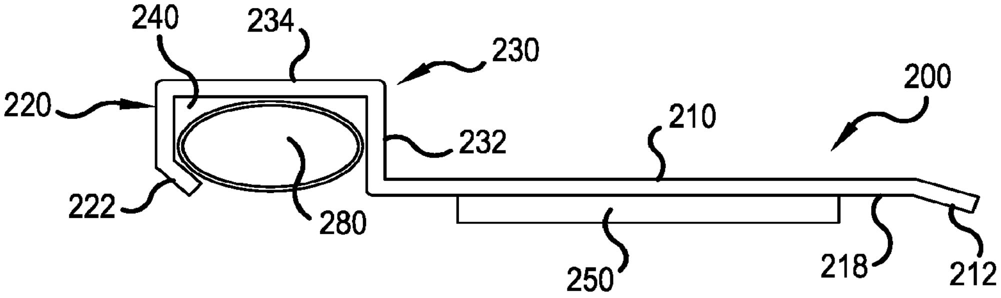
FIG. 5 is a partial cross-sectional view of the cover of FIG. 4.

FIGS. 4 and 5 illustrate a cover 200, which is an alternative exemplary embodiment of a cover made in accordance with the present invention. The device 200 is identical to the device 100 as described and shown and includes similar features and characteristics, except as noted and shown. The device 200 includes a main body 210, a front member 220 and a middle portion 230. The front member includes a bottom portion 222. The middle portion 230 has a cross-sectional shape that is different than the cross-sectional shape of the middle portion 130, which is generally an arched shape. In this exemplary embodiment the cross-sectional shape of the middle portion 230 includes two portions 232 and 234. The two portions 232 and 234 and the front member 220 forms a channel 240. The channel 240 in this embodiment has a partial rectangular cross-sectional shape, missing one side of the rectangle. In this embodiment, there is a bend between the two portions 232 and 234 as shown. With such an arrangement for the channel 240, a heat element 280, shown in FIG. 5, but not shown in FIG. 4, resides substantially within the channel 240 when the cover 200 is in use. The channel 240 is operably configured to increase heat transfer to the cover 200 from the heat element 280 when the cover 200 is in use and the heat element is energized. In this exemplary embodiment, the channel 240 is defined by the middle portion 230 and the front member 220, including the bottom portion 222.

The cover 200 further includes a fastener 250. The fastener 250 is disposed on the surface 218. The fastener is preferred to be any conventional double-sided tape. This embodiment does not include an indent like the indent 117 of the cover 100.

Figure 6:
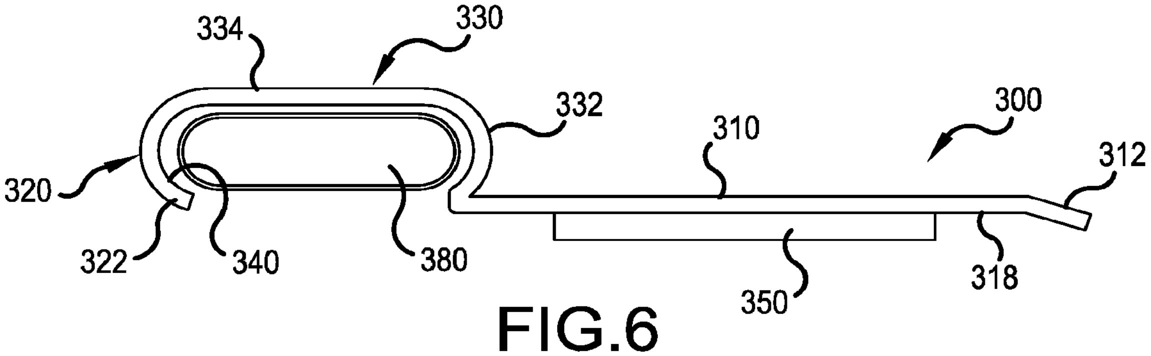
FIG. 6 is a partial cross-sectional view of an alternative embodiment of a heat cable cover made in accordance with the present invention.

FIG. 6 illustrates a cover 300, which is an alternative exemplary embodiment of a cover made in accordance with the present invention. The device 300 is identical to the device 100 as described and shown and includes similar features and characteristics, except as noted and shown. The device 300 includes a main body 310, a front member 320 and a middle portion 330. The front member 320 includes a bottom portion 322. The middle portion 330 has a cross-sectional shape that is different than the cross-sectional shape of the middle portion 130, which is generally an arched shape. In this exemplary embodiment the cross-sectional shape of the middle portion 330 includes two portions 332 and 334. The two portions 332 and 334 and the front member 320 forms a channel 340. The channel 340 in this embodiment has a partial elliptical type cross-sectional shape, missing one side of the ellipse. In this embodiment, there is a bend between the two portions 232 and 234 as shown. Further portion 332 is a curved portion. With such an arrangement for the channel 340, a heat element 380 resides substantially within the channel 340 when the cover 300 is in use. The channel 340 is operably configured to increase heat transfer to the cover 300 from the heat element 380 when the cover 300 is in use and the heat element is energized. In this exemplary embodiment, the channel 340 is defined by the middle portion 330 and the front member 320, including the bottom portion 322.

The cover 300 further includes a fastener 350. The fastener 350 is disposed on the surface 318. The fastener is preferred to be any conventional double-sided tape. This embodiment does not include an indent like the indent 117 of the cover 100.

It should and will be appreciated that various embodiments of covers made in accordance with the present invention can be utilized with a different types of gutter guards and different shaped gutter guards. Some examples of different shaped and types of gutter guards are illustrated in FIGS. 7, 8, 9 and 10.

Figure 7:
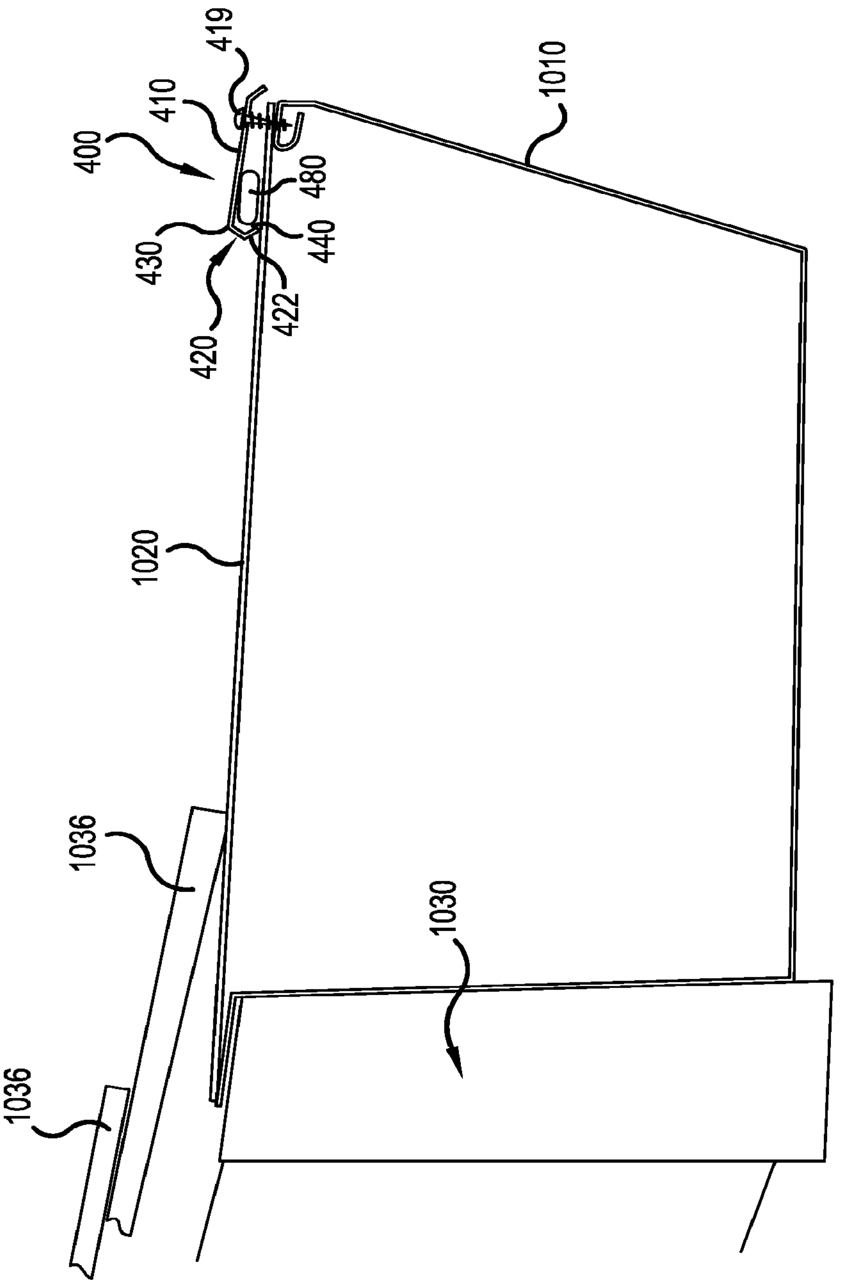
FIG. 7 is a partial cross-sectional view of an alternative embodiment of a heat cable cover made in accordance with the present invention.

FIG. 7 illustrates a cover 400, which is an alternative exemplary embodiment of a cover made in accordance with the present invention. The device 400 is identical to the device 100 as described and shown and includes similar features and characteristics, except as noted and shown. The device 400 includes a main body 410, a front member 420 and a middle portion 430. The front member 420 includes a bottom member 422. The device 400 further includes a channel 440, which is operably configured to receive a heat element 480. The device 400 further includes a fastener 419. The fastener 419 is a screw. This figure illustrates how the device 400 is operably configured to be on a gutter guard 1020. The gutter guard 1020 is virtually flat. The gutter guard lays atop a gutter 1010, which is affixed to a building 1030 having shingles 1036.

Figure 8:
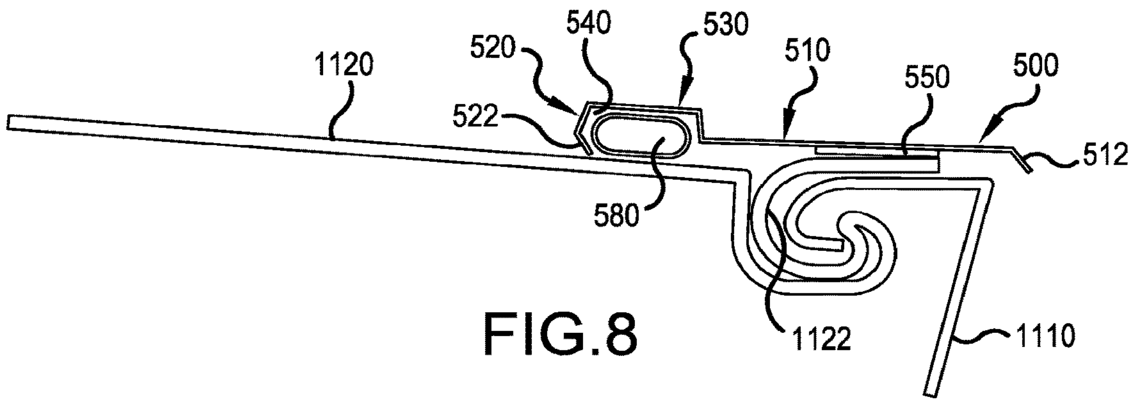
FIG. 8 is a partial cross-sectional view of an alternative embodiment of a heat cable cover made in accordance with the present invention.

FIG. 8 illustrates a cover 500, which is an alternative exemplary embodiment of a cover made in accordance with the present invention. The device 500 is identical to the device 200 as described and shown and includes similar features and characteristics, except as noted and shown. The device 500 includes a main body 510, a front member 520 and a middle portion 530. The front member 520 includes a bottom member 522. The device 500 further includes a channel 540, which is operably configured to receive a heat element 580. The device 500 further includes a fastener 550. This figure illustrates how the device 500 is operably configured to be on a gutter guard 1120. The gutter guard 1120 is configured to wrap around the top lip of a gutter 1110, which is affixed to a building, not shown. The gutter guard 1120 connects to the gutter 1110 with a clip 1122.

Figure 9:
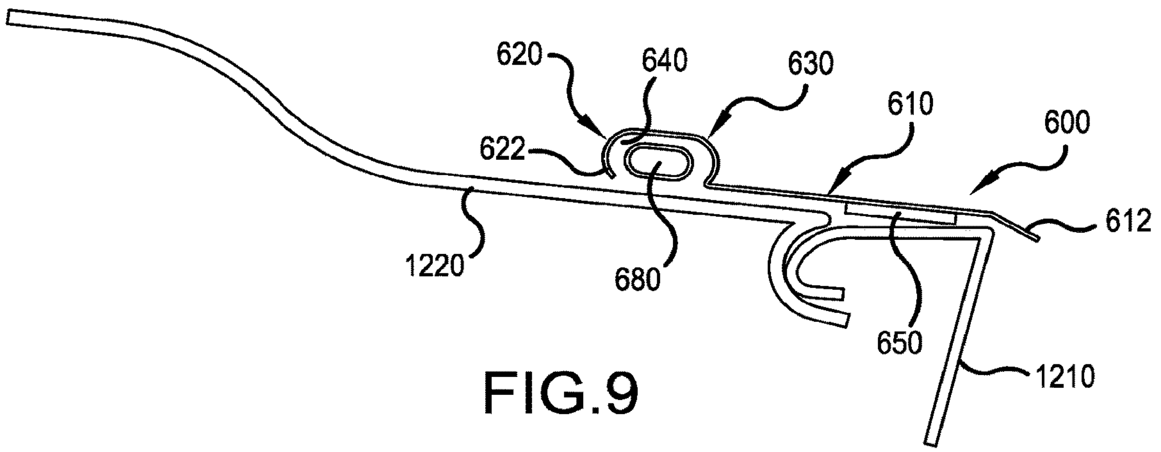
FIG. 9 is a partial cross-sectional view of an alternative embodiment of a heat cable cover made in accordance with the present invention.

FIG. 9 illustrates a cover 600, which is an alternative exemplary embodiment of a cover made in accordance with the present invention. The device 600 is identical to the device 300 as described and shown and includes similar features and characteristics, except as noted and shown. The device 600 includes a main body 610, a front member 620 and a middle portion 630. The front member 620 includes a bottom member 622. The device 600 further includes a channel 640, which is operably configured to receive a heat element 680. The device 600 further includes a fastener 650. This figure illustrates how the device 600 is operably configured to be on a gutter guard 1220. The gutter guard 1220 is configured to snap into the lip of a gutter 1210, which is affixed to a building, not shown. Further, the gutter guard 1220 includes an arched profile.

Figure 10:
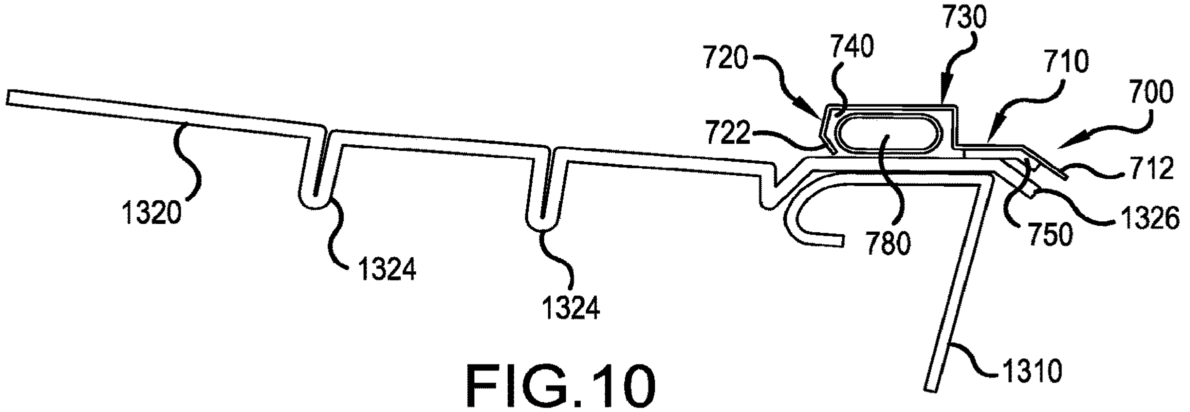
FIG. 10 is a partial cross-sectional view of an alternative embodiment of a heat cable cover made in accordance with the present invention; and, FIG. 11 is a partial cross-sectional view of an alternative embodiment of a heat cable cover made in accordance with the present invention.

FIG. 10 illustrates a cover 700, which is an alternative exemplary embodiment of a cover made in accordance with the present invention. The device 700 is identical to the device 200 as described and shown and includes similar features and characteristics, except as noted and shown. The device 700 includes a main body 710, a front member 720 and a middle portion 730. The front member 720 includes a bottom member 722. The device 700 further includes a channel 740, which is operably configured to receive a heat element 780. The device 700 further includes a fastener 750. This figure illustrates how the device 700 is operably configured to be on a gutter guard 1320. The gutter guard 1320 is configured to wrap around the top lip of a gutter 1310, which is affixed to a building, not shown. The gutter guard 1320 includes downwards legs 1324 and includes a drip edge 1326.

Figure 11:
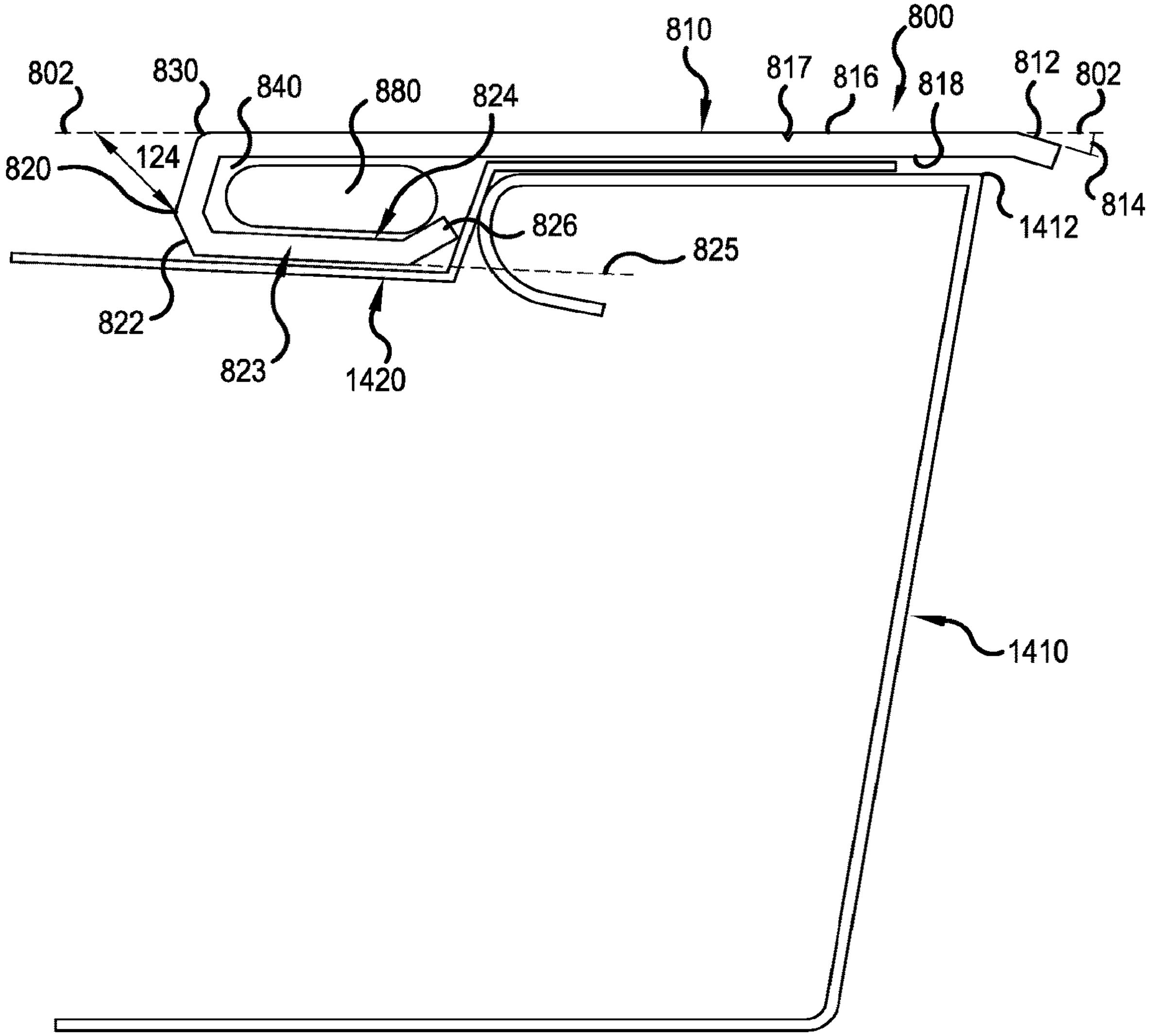

FIG. 11 illustrates a cover 800, which is an alternative exemplary embodiment of a cover made in accordance with the present invention. The device 800 is identical to the device 100 as described and shown and includes similar features and characteristics, except as noted and shown. The device 800 includes a main body 810, a front member 820 and a middle portion 830. The front member 820 includes a bottom member 822. The device 800 further includes a channel 840, which is operably configured to receive a heat element 880. This figure illustrates how the device 800 is operably configured to be on a gutter guard 1420. The gutter guard 1420 is configured to engage a top lip of a gutter 1410, which is affixed to a building, not shown.

The main body 810 includes a top surface 817 and a bottom surface 818. The main body 810 further includes an indent 816. The main body 810 further includes a front lip 812 having a lip angle 814, relative to the plane of the main body 802.

A difference between the cover 800 and the cover 100 is that the cover 800 further includes a second body member 823 attached to the bottom member 822. The second body member 823 includes channel surface 824. The second body member 823 further defines the channel 840. The second body member 823 extends along second body member plane 825. It is preferable that the second body member plane 825 be substantially parallel to the main body plane 802. The second body member 823 extends along the second body member plane 825 toward the lip 812. The channel surface 824 is operably configured to be engaged with the heat element 880 when the cover is in use. The second body member includes an end 826 that extends toward the main body member 810. The end 826 is angled from the plane 825.

A benefit that will be readily appreciated with the cover 800, is that the cover 800 does not push the heat cable 880 against the gutter guard 1420. Further, the life span of the heat element 880 will be increased because the heat element 880 is less exposed to roof sand grind that could over time degrade and/or penetrate a plastic outer jacket of the heat element.

Another benefit with the cover 800 having the second body member 823 is that the channel 840 is capable of better retaining the heat element 880 when in use than in embodiments without the second body member. With the heat element 880 being better retained in the channel 840 by the second body member 823 the cover 800 is more efficiently installed than other covers. An installer will snap or slide the heat element 880 in the channel 840 then when installing the cover 800 on the gutter guard 1420, the installer will not have to hold the heat element 880 while attempting to fasten the cover 800 to the gutter guard 1420 over the heat element 880.

Another benefit of cover 800 is that with the second body member 823 creating a more enclosed channel 840 is that the cover 800 is efficient in radiating heat and has less heat loss than conventional covers. Having the second body member 823 being a solid piece of material will increase heat conduction from the heat element 880.

It should be appreciated that covers made in accordance with various exemplary embodiments of the present invention have channels that will have various cross-sectional shapes among the various embodiments. These various cross-sectional shapes of the channel are preferably configured to be similarly shaped as a heat element that will be utilized with the cover. The more closely fitted the heat element is within the channel, the more effective the heat transfer will be from the heat element to the cover when the heat element is energized.

It should be apparent that the cover can be constructed of other materials such as plastic, expanded metal, perforated metal, slotted metal or louvered metal slits, and so forth.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A heat element covering for a gutter debris preclusion device attached to a gutter having a gutter lip, comprising:

- a unitary single piece cover having a gutter lip-side section and a roof-side section, wherein, when the unitary single piece cover is installed, the gutter lip-side section rests over the gutter lip and the roof-side section rest overs the gutter debris preclusion device;
- a front member integrally joined to a terminal end of the roof-side section, downwardly oriented from the unitary single piece cover forming a roof-side, heat element lateral boundary;
- a top member integrally joined to a top of the front member and extending towards the gutter lip-side section, forming an upper heat element boundary, the top member being elevated from a plane of the gutter lip-side section; and
- a rear member integrally joined to a gutter lip-side end of the top member, downwardly oriented and connecting to the gutter lip-side section, forming a gutter lip-side, heat element lateral boundary;
- wherein, the front member, top member and rear member form a channel proximal to the gutter lip.

2. The heat element covering as recited in claim 1, wherein the channel has a cross-sectional shape of a partial rectangle.

3. The heat element covering as recited in claim 2, further comprising an adhesive tape disposed on a bottom of the gutter lip-side section.

4. The heat element covering as recited in claim 1, wherein the channel has a cross-sectional shape of a partial ellipse.

5. The heat element covering as recited in claim 4, further comprising an adhesive tape disposed on a bottom of the gutter lip-side section.

6. The heat element covering as recited in claim 1, wherein the channel has a cross-sectional shape of a partial sinusoidal curve.

7. The heat element covering as recited in claim 6, further comprising an adhesive tape disposed on a bottom of the gutter lip-side section.

8. The heat element covering as recited in claim 1, wherein the front member includes a bottom portion, wherein the bottom portion extends toward the channel.

9. The heat element covering as recited in claim 1, further comprising a gutter lip attachment means disposed on a bottom of the gutter lip-side section.

10. The heat element covering as recited in claim 9, wherein the attachment means is an adhesive tape.

11. The heat element covering as recited in claim 1, wherein the front and rear members are oriented to form a curve from the top member.

12. The heat element covering as recited in claim 1, wherein front member has an upper first portion and a lower second portion that are angled from each other.

13. The heat element covering as recited in claim 12, wherein at least the lower second portion and top member are disposed above the plane of the gutter lip-side section.

14. A gutter debris preclusion device heat element cover, comprising:

- a single piece unitary covering body, having a roof side and a gutter lip side, wherein the roof side rests over a gutter debris preclusion device and the gutter lip side is attached to a top of a lip of a gutter when the single piece unitary covering body is in use, also having,
  - a front leg disposed at a terminal end of the roof side, oriented downwardly with an end portion directed towards the gutter lip side forming a left wall of a heat element channel,
  - a middle portion joining a top of the front leg and extending towards the gutter lip side, the middle portion forming a top wall of the heat element channel;
  - a rear leg joining a gutter lip end of the middle portion, and extending downwardly; and
  - a gutter lip member joining a bottom of the rear leg, extending horizontally to an end of the gutter lip side,
- wherein the top of the heat element channel is elevated from a plane of the gutter lip member and the heat element channel is proximal to the lip of the gutter when the gutter debris preclusion device heat element cover is mounted to the gutter.

15. The gutter debris preclusion device heat element cover as recited in claim 14, wherein an entirety of the heat element channel is elevated from the plane of the gutter lip member.

16. The gutter debris preclusion device heat element cover as recited in claim 14, wherein the heat element channel has a cross-sectional shape of a partial rectangle.

17. The gutter debris preclusion device heat element cover as recited in claim 14, wherein the heat element channel has a cross-sectional shape of a partial ellipse.

18. The gutter debris preclusion device heat element cover as recited in claim 14, wherein the heat element channel has a cross-sectional shape of a partial sinusoidal curve.

19. The gutter debris preclusion device heat element cover as recited in claim 14, further comprising an adhesive tape disposed on a bottom of the gutter lip member.

20. The gutter debris preclusion device heat element cover as recited in claim 14, further comprising a drip edge formed at a terminal end of the gutter lip member.

* * * * *